United States Patent
Martin et al.

(10) Patent No.: US 10,922,318 B2
(45) Date of Patent: Feb. 16, 2021

(54) SYSTEMS AND METHODS FOR CACHING QUERIES AND QUERY RESULTS

(71) Applicant: Meteor Development Group, Inc., San Francisco, CA (US)

(72) Inventors: Nicholas Martin, San Bruno, CA (US); Matthew DeBergalis, San Francisco, CA (US); Geoffroy Pierre Alexis Carrier, Toronto (CA)

(73) Assignee: Apollo Graph, Inc., San Francisco, CA (US)

( * ) Notice: Subject to any disclaimer, the term of this patent is extended or adjusted under 35 U.S.C. 154(b) by 228 days.

(21) Appl. No.: 15/687,379

(22) Filed: Aug. 25, 2017

(65) Prior Publication Data

US 2019/0065500 A1     Feb. 28, 2019

(51) Int. Cl.
*G06F 16/2455* (2019.01)
*G06F 16/951* (2019.01)
*G06F 16/21* (2019.01)

(52) U.S. Cl.
CPC ...... *G06F 16/24552* (2019.01); *G06F 16/211* (2019.01); *G06F 16/951* (2019.01)

(58) Field of Classification Search
CPC . G06F 16/24552; G06F 16/951; G06F 16/211
See application file for complete search history.

(56) References Cited

U.S. PATENT DOCUMENTS

| | | | | |
|---|---|---|---|---|
| 10,558,671 B2* | 2/2020 | Tamjidi | ............. | G06F 16/24566 |
| 2002/0133537 A1* | 9/2002 | Lau | ..................... | H04L 67/1008 709/203 |
| 2004/0249682 A1* | 12/2004 | DeMarcken | .......... | G06Q 10/02 705/5 |
| 2007/0179928 A1* | 8/2007 | Basu | .................... | G06F 16/9574 |
| 2007/0180144 A1* | 8/2007 | Basu | ....................... | G06F 16/80 709/246 |
| 2007/0208690 A1* | 9/2007 | Schneider | ......... | G06F 16/24553 |
| 2011/0137888 A1* | 6/2011 | Yoo | ..................... | G06F 16/9574 707/713 |
| 2012/0143923 A1* | 6/2012 | Whitney | ............... | G06F 16/907 707/803 |
| 2012/0203825 A1* | 8/2012 | Choudhary | ......... | H04L 65/4076 709/203 |
| 2014/0310232 A1* | 10/2014 | Plattner | ............ | G06F 16/24539 707/602 |
| 2017/0344605 A1* | 11/2017 | Wells | ................ | G06F 16/24535 |
| 2017/0346875 A1* | 11/2017 | Wells | ...................... | H04L 65/80 |

FOREIGN PATENT DOCUMENTS

CN     109587212 A  *  4/2019

OTHER PUBLICATIONS

Krick, Matt. "How Cashay Combines GraphQL with Redux". Jul. 8, 2016. [online] [retrieved on Jun. 23, 2019]. Retrieved from the Internet<URL:https://medium.com/@matt.krick/how-cashay-combines-graphql-with-redux-a67158499d07> (Year: 2016).*

(Continued)

*Primary Examiner* — James E Richardson
(74) *Attorney, Agent, or Firm* — Berkeley Law & Technology Group, LLP

(57) ABSTRACT

Embodiments of a proxy operating for an endpoint to cache queries and query results are disclosed.

30 Claims, 7 Drawing Sheets

(56) References Cited

OTHER PUBLICATIONS

Krick, Matt. "How to Build a GraphQL Client Cache—Part I". Jan. 27, 2016. [online], [retrieved on Jun. 23, 2019]. Retrieved from the Internet<URL: https://medium.com/@matt.krick/how-to-build-a-graphql-client-cache-part-i-25e698acd8af> (Year : 2016).*
"Thinking in GraphQL". Archived at archive.org on Dec. 24, 2016. Facebook. [online] [retrieved on Jun. 23, 2019]. Retrieved from the internet:<URL: https://web.archive.org/web/20161224175845/http://facebook.github.io/relay/docs/thinking-in-graphql.html> (Year: 2016).*
Mattkrick. "Cashay.js". Jun. 23, 2016. [online] [retrieved on Jun. 23, 2019]. Retrieved from the Internet<URL:https://github.com/mattkrick/cashay/blob/v0.10.2/src/Cashay.js> (Year: 2016).*
Microsoft Press Computer Dictionary Third Edition. 1997. Microsoft Press. ISBN: 1-57231-446-X. pp. 72 & 387 (Year: 1997).*
Lowe, Doug. Networking All-in-One for Dummies, 5th Edition. Nov. 2012. ISBN: 9781118380987. Ch. 4 (Year: 2012).*
Buna. Learning GraphQL and Relay. Aug. 2016. Packt Publishing. Retreived on Sep. 28, 2020. Retrieved from the Internet https://learning.oreilly.com/library/view/learning-graphql-and/9781786465757/. ISBN: 9781786465757. Selected chapters. (Year: 2016).*
GraphQL, "A Query Language for Your API," http://graphql.org/, Jun. 1, 2017, 9 Pages.
GraphQL, "GraphQL: A Data Query Language," https://code.facebook.com/posts/1691455094417024/graphql-a-data-query-language/, Sep. 14, 2015, 3 Pages.
Apollo GraphQL, "Apollo provides a universal GraphQL API on top of your existing services, so you can build new application features fast without waiting on backend changes," https://www.apollodata.com/, Jun. 1, 2017, 5 Pages.
Wikipedia, "Rate Limiting," https://en.wikipedia.org/wiki/Rate_limiting, Jun. 1, 2017, 2 Pages.
GraphQL, "Caching," http://graphql.org/learn/caching/, Dec. 7, 2017, 3 Pages.
Sturgeon, "GraphQL vs Rest: Caching," https://philsturgeon.uk/api/2017/01/26/graphqi-vs-rest-caching/, Jan. 26, 2017, 7 Pages.
GraphQL, "Thinking in GraphQL," http://facebook.github.io/relay/docs/en/thinking-in-graphql.html#client-caching, Dec. 7, 2017, 13 Pages.
NPM, "graphql-cache," https://www.npmjs.com/package/graphql-cache, Dec. 7, 2017, 7 Pages.
Github, "Apollograhql—Client," https://github.com/apollographql/apollo-client, Dec. 7, 2017, 4 Pages.
Github, "Apollograhql-Server," https://github.com/apollographql/apollo-server, Dec. 7, 2017, 6 Pages.
Github, "Apollograhql-Dataloader," https://github.com/facebook/dataloader, Dec. 7, 2017, 8 Pages.
Apollo Graphol Tools, "Data fetching," https://www.apollographql.com/docs/graphql-tools/connectors.html#dataloader, Dec. 7, 2017,5 Pages.
Apache, "Caching Guide," https://httpd.apache.org/docs/2.4/caching.html, Dec. 7, 2017, 11 Pages.
NGINX, "A Guide to Caching with NGINX and NGINX Plus," https://www.nginx.com/blog/nginx-caching-guide/, Jul. 23, 2015, 15 Pages.
Fastly, "Fastly powers fast, secure, and scalable digital experiences," https://www.fastly.com/, Dec. 7, 2017, 6 Pages.
Akamai, "The World's Largest and Most Trusted Cloud Delivery Platform," https://www.akamai.com/, Dec. 7, 2017, 3 Pages.
AWS, "Amazon CloudFront," https://aws.amazon.com/cloudfront/, Dec. 7, 2017, 8 Pages.
Sangria, "Protection Against Malicious Queries", https://sangria-graphql.org/learn/#protection-against-malicious-queries, Jan. 24, 2018, 22 pages.
Youtube, "GraphQL SF: Subscriptions, Yelp's Public API, GraphQL at Airbnb", https://youtube.com/watch?v=rap030fpREg, Jun. 1, 2017, 2 pages.
Github Developer, "GraphQL resource limitations", https://developer.gitbhub.com/v4/guides/resource-limitations, Jan. 24, 2018, 7 pages.
Github Developer, "Rate Limit", https://developer.github.com/v3/rate_limit/ Jan. 24, 2018, 2 pages.
Akami, "DDoS Protection", https://www.akamai.com/uk/en/resources/ddos-protection.jsp, Jan. 24, 2018, 3 pages.
Facebook for Developers, "Rate Limiting on the Graph API", Jan. 24, 2018, 8 pages.
AWS, "Throttle API Requests for Better Throughout", https://docs.aws.amazon.com/apigateway/latest/deveoperguide/api-gatewray-request-throttling.html, Jan. 24, 2018, 3 pages.
NGINX, "Rate Limiting with NGINX and NGINX Plus," https://www.nginx.com/blog/rate-limiting-nginx/, Jun. 12, 2017, 11 pages.
U.S. Appl. No. 15/876,065, filed Jan. 19, 2018, 105 pages.
U.S. Appl. No. 15/876,065: Filing Receipt, Feb. 14, 2018, 3 pages.
U.S. Appl. No. 15/876,065: Notice to File Missing Parts, Feb. 14, 2018, 2 pages.
U.S. Appl. No. 15/876,065: Applicant Response to Pre-Exam Formalities Notice, Feb. 15, 2018, 8 pages.
U.S. Appl. No. 15/876,065: Filing Receipt, Feb. 23, 2016, 3 pages.
U.S. Appl. No. 15/876,065: Preliminary Amendment, May 4, 2018, 4 pages.

\* cited by examiner

300

Base Schema

Annotated Schema

```
type RootQuery {
  fieldA: Int
  fieldB: Int
  fieldC: Int
}
```
311

```
schema {
  query: RootQuery
}
```
310

```
type RootQuery {
  @cache("1h")
  fieldA: Int
  @cache("5m")
  fieldB: Int
  @nocache
  fieldC: Int
}
```
321

```
schema {
  query: RootQuery
}
```
320

```
query {        query {        query {
  fieldA         fieldA         fieldA
}              fieldB         fieldC
               }              }
```

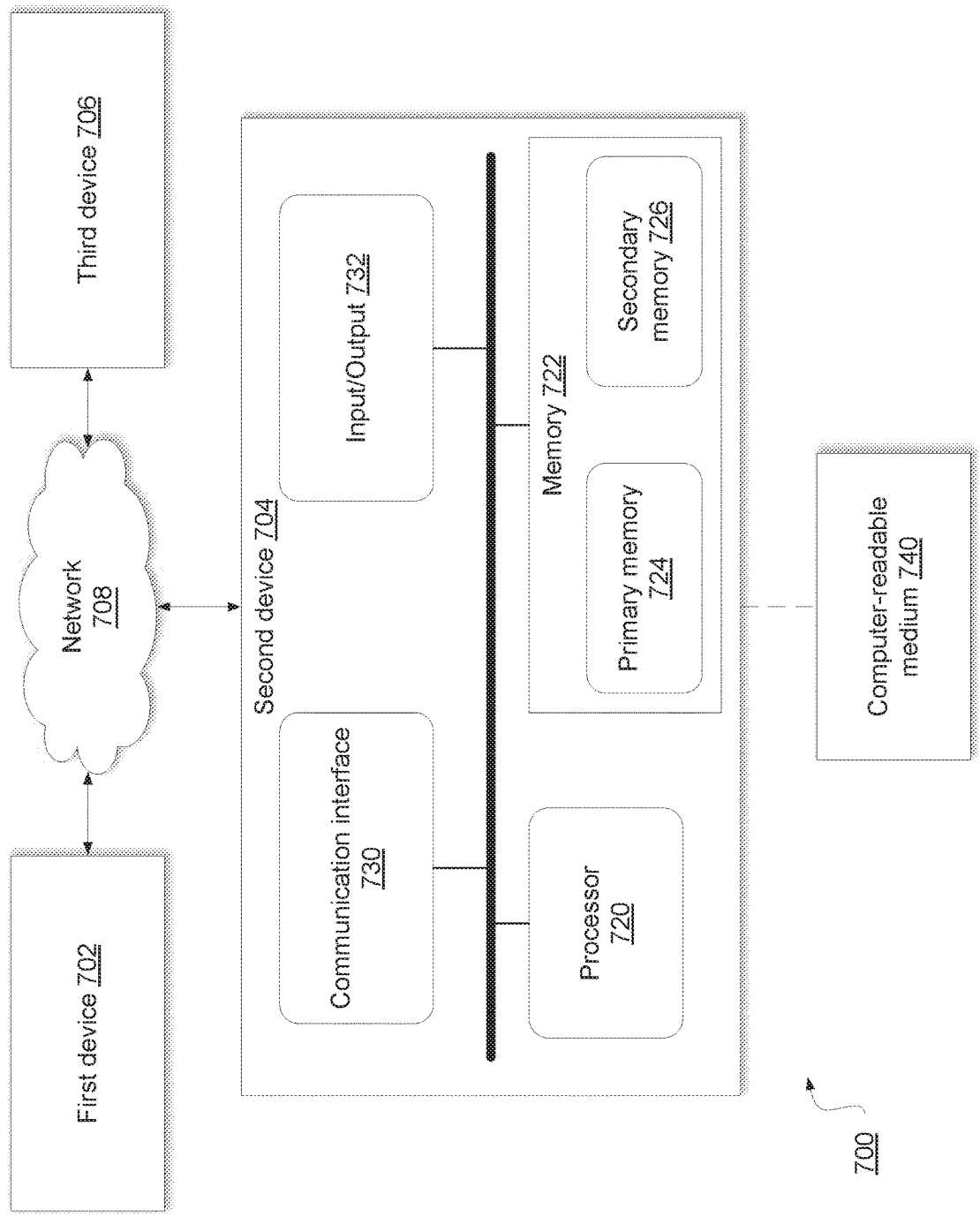

SYSTEMS AND METHODS FOR CACHING QUERIES AND QUERY RESULTS

BACKGROUND

Field

This disclosure relates to caching query results for one or more queries formulated in a particular query language.

Information

As networking, such as via the Internet, for example, becomes more ubiquitous, approaches to improve networking performance continue to develop. As simply one example, improved performance of mobile device software applications continues to be desirable.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 3 is a chart illustrating, for an embodiment, an example schema and an example annotated schema for an embodiment;

FIG. 4 is another chart illustrating, for an embodiment, example queries;

FIG. 7 is an illustration of an embodiment of a system in a networking and/or computing environment.

Figure 1:
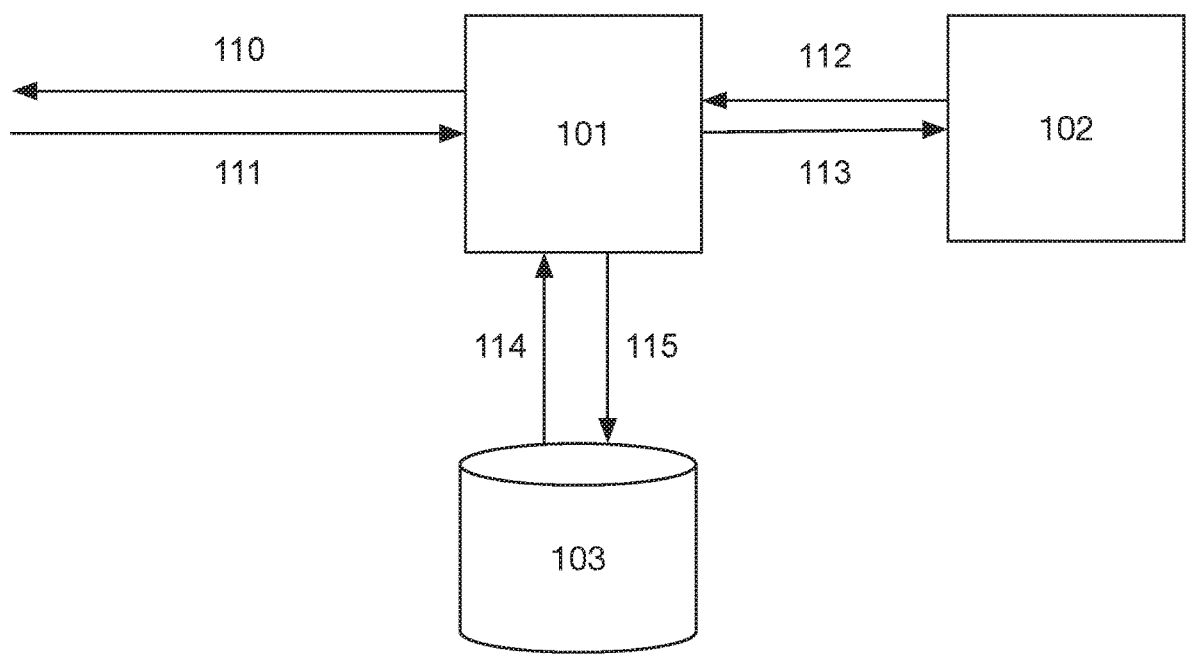
FIG. 1 is schematic diagram illustrating an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present disclosure, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations. With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

As mentioned above, although claimed subject matter is not limited to the WWW and/or the Internet, it provides a useful example of a network environment for purposes of illustration; however, it is to be understood that claimed subject matter is intended to not be limited to examples provided for purposes of illustration. With this in mind, networking signal packet traffic, such as in connection with the WWW, typically may include client (e.g., client device) requests made to one or more servers (e.g., server devices), in which the one or more servers may be employed to provide one or more services, such as for the WWW via one or more websites (e.g., that may be implemented via the one or more servers, again, as an example). Thus, networking traffic may include client requests, and/or website responses in this example, which may include client requests for content and/or may include website responses, for example, providing requested content.

Thus, as one example, in an embodiment, a client may request content for a mobile application executing on the client device, such as, for example, a weather application, a news application, a stock market application, a music application, or any of an indefinite number of other possible examples. Likewise, the mobile application itself may generate one or more of the client requests for content. For example, a client may request stock prices for a particular company for a certain period of time, say, the last month. In this example, a graphical user interface (GUI) associated with the mobile application may be executing on the client device. Thus, a user, for example, may interact with the GUI associated with the mobile application. As a result, in this example, the user's desire for content, instantiated via the GUI, may result in generation of one or more client requests for content, such as content to be received from one or more websites. Likewise, as suggested, for this illustration, content requests may come from the client device and may have been generated via the mobile application executing on the client device. For convenience, throughout the rest of the present disclosure, a single website with a single server shall be referenced, with the understanding, as described previously, that multiple websites and/or multiple servers may likewise be involved, for example, in a given embodiment.

For technology product developers, it may become convenient to move toward commonly standardized and/or commonly specified approaches for content requests. Thus, for example, a mobile application may employ an application programming interface (API). Here, the term application programming interface refers to a well-formulated set of protocols that are used by software components to communicate with one another. It is likewise noted that software components communicating via use of an API may reside on physically and/or logical separate devices, such as hardware devices, that may communicate via a network, for example. Thus, in this example, a mobile application may be able to generate content requests in a particular query language that is capable of being recognized and processed by a server device that is to receive the one or more requests for content. While several query languages exist and may be employed in this matter, the number of such languages comprises a manageable set of possibilities. Thus, via a client device, a mobile application, such as in this example, may send one or more requests to a server, and the server may respond by providing some or all of the requested content to the requesting client device. A server may be able to provide requested content if an application, such as a mobile application, is able to provide a content request in a manner that the server is able to process, such as a content request comprising a specific query made in a specific query language.

One approach to client-server interactions is typically referred to as Representational State Transfer (REST) and may be used in connection with providing REST-type services for systems, such as operating via the WWW. So-called REST-type application programming interfaces (APIs) may generate a content request by specifying a uniform resource locator (URL) and a desired media type, often in the form of an HTTP communication. As previously suggested, to provide some form of common understanding, query languages may be used in APIs to formulate queries for specific content being sought, which likewise may be transmitted via a network to a server that is providing a service, which may, as examples, comprise a database or other content repository. Examples of query languages include SQL, XPATH, and GraphQL, but these are just illustrative examples. The term Structured Query Language, SQL, and/or similar terms are intended to refer to any version, now known and/or to be later developed. The term XML Path Language, XPATH, and/or similar terms are intended to refer to any version, now known and/or to be later developed. The term GraphQL, and/or similar terms are intended to refer to any version, now known and/or to be later developed, of the GraphQL query language. As used herein, the terms query, queries or the like refer to one or more queries formulated in a particular query language, such as one of the foregoing languages, for example. Thus, as described previously, an application executing on a device, such as a mobile application executing on a client device, may generate one or more requests for content, such as if a user interacts with a GUI of the client device. Generated content requests may be in the form of a specific query language, and may be sent to an appropriate server. Likewise, thus, a server to receive content requests may be able to process content requests provided in the particular query language.

One aspect related to the approach mentioned above, REST, in the context of REST-type APIs, is that different queries typically are directed to different URLs, if different types of content is being requested, for example. That is, the URL itself at least in part specifies the content request being made, as a type of query, for example. This approach may be beneficial in terms of planning for server utilization and/or resource load balance; for example, externally derived content requests may be more easily managed via use of a scheme of different URLs to receive different content requests for different content types.

As alluded, an approach that employs REST may be beneficial in terms of server utilization, etc. For example, different URLs may be able to employ different cache policies. Caching, as used herein, refers to temporary storage of content at a different location than its origin (e.g., original or initial location. For example, the term cache often refers to high speed memory, which may comprise a limited resource for a given server. Thus, for a computing device, such as a server, as an example, a cache policy that may be implemented via the server may specify rules, such as what kind of content is to be cached, and how long it is to be cached, as illustrative examples. Likewise, in some situations, some content may be deemed cacheable and some content may be deemed non-cacheable, which may be described as specifying cacheable content. For example, some content intended to be retrieved from elsewhere may be non-cacheable, as an example. Further, there may be conditions associated with specified cacheable content. For example, certain content may be cacheable at certain particular times, or under certain network traffic conditions, but otherwise may be non-cacheable. Of course, these are simply illustrative examples of cache policies and claimed subject matter is not intended to be limited to these examples. Other variations in cache policy are possible and are nonetheless intended to be included within claimed subject matter.

Likewise, a particular cache policy for a server may affect server performance and, thus, may consequently affect perceived responsiveness of an associated website. Caching policy, thus, may specify content so that it may be quickly available to satisfy content requests. Hence, other content not stored in 'cache,' so to speak, might take longer to be retrieved, in this example. Thus, as indicated, cache policy may affect performance and/or perceived responsiveness. In a REST-type approach, however, performance and/or perceived responsiveness may be managed in a relatively effective manner depending at least in part on selection of content made available via particular URLs.

However, a REST-type approach, as referred to above, may likewise make generating executable applications, such as mobile applications for consumer devices, more difficult. As one example, small changes to a URL, small changes to content to be obtained, etc., may result in a custom software update to maintain performance. Likewise, for some situations, such an approach may not be feasible and/or desirable. Rather, it may be the case that content requests are not managed, so to speak, via a scheme of various URLs. Some query languages, such as GraphQL, for example, may not be susceptible to that approach. Instead, for example, content requests may be transmitted to a particular URL location with the request itself seeking particular content via a query request made via a particular query language. Thus, content requests are directed to a common location even if various portions of requested content originate from different locations. That is, for some query languages, GraphQL being an example, different URL locations are not employed to, in effect, manage content requests. Whereas in a REST-type approach URLs may include queries, in contrast, for some query languages, for example GraphQL, a different approach may employ URLs that do not at least partially contain a query.

As previously alluded, such an approach involving particular query languages, such as GraphQL, may make generating executable code for an application, such as a mobile application, less complex and/or perhaps more desirable. For example, one URL may be employed in connection with use of a variety of APIs to obtain various sorts of content, from various network locations, for an application, such as a mobile application. However, likewise, managing a server to meet such received content requests may become more challenging. Thus, likewise, server performance and/or perceived responsiveness may be adversely affected for a given server and/or website.

Such issues may, in some situations, be particularly challenging in connection with mobile applications. For example, a client device that also comprises a mobile device may employ a wireless connection, which may be less reliable and/or provide less bandwidth than a wired connection. Likewise, a mobile device may have a more limited amount of memory and/or processing capability relative to a desktop computing device, for example. It is specifically not intended for claimed subject matter to be limited to mobile applications. Desktop applications, as well as applications which may not be intended for users, are also intended to be included within claimed subject matter; however, since mobile applications may present some challenges that may not be present for other types of applications, mobile applications are discussed below as an illustrative example.

FIG. 1 is a schematic diagram illustrating an embodiment 100. As shown, embodiment 100 includes an endpoint 102, a cache proxy 101, and cache (e.g., cache memory) 103. For purposes of embodiment 100, proxy 101 and endpoint 102 need not be physically adjacent, although shown to be in FIG. 1. Rather, in this illustration, proxy 101 and endpoint 102 may comprise separate network addressable devices able to exchange communications, such as transmissions, via a network, such as via a computing and/or communications network. Although proxy 101 and endpoint 102 may comprise a variety of devices, for ease of discussion, in this example, these devices respectively comprise a computing device, such as a server, for example. Thus, endpoint 102 may comprise an origin server (e.g., a server comprising an origin for content which may, for example, be requested, such as via clients able to provide content requests via a computing and/or communications network). Likewise, for ease of discussion, cache 103 is illustrated separately from proxy 101; however, it may comprise a component of proxy 101, for example. Likewise, cache 103 may comprise any of a variety of storage devices capable of temporarily storing content to be cached.

Thus, as an example, a particular origin server may specify that content requests are to comprise queries to be formulated in GraphQL, and may specify that content requests be directed to a particular URL endpoint. As suggested, a potential benefit may be that application developers, such as mobile application developers, may prepare APIs to formulate client requests as a GraphQL query directed to an origin server corresponding to the particular URL endpoint. However, also as alluded to previously, managing a range of content requests may provide technical challenges for an origin server, for example. In some embodiments, an origin server may have access to several databases located on various network devices in a network, using various protocols and containing various content. Managing various protocols and types of content, across potentially numerous network locations, to effectively satisfy content requests, may provide technical challenges. Similarly, specifying a cache policy for various kinds of content from various network locations using various protocols, for various clients, may also provide technical challenges.

As shall be described, for an embodiment, such as 100, a potential benefit of employing a cache proxy, such as 101, having a cache, such as 103, may include that a content request to provide content that is cached may be satisfied by providing content stored in cache 103, rather than seeking content from endpoint 102. Other potential benefits, described in more detail below, may also be present depending at least in part on the particular embodiment. Of course, these are illustrative examples, and claimed subject matter is not limited to examples provide for purposes of illustration.

Endpoint 101 in an illustrative embodiment, such as 100, may be identified by a Uniform Resource Locator (URL). Proxy 101 may receive queries (e.g., content requests as a query, as previously described) intended for endpoint 102 and may process them, as will be described in detail below. For example, an application, such as a mobile application, executing on a client device, such as a mobile device, may make a request for content from endpoint 102 via a communication to the URL for endpoint 102. However, proxy 101 may operate as an intermediary for requests from clients seeking resources, such as content, from endpoint 102. Thus, in operation, endpoint 102 may redirect content requests to proxy 101 or, alternatively, a client content request directed to endpoint 102 and transmitted to the URL for endpoint 102 may go directly to proxy 101 before reaching endpoint 102. It is noted that in addition to the foregoing a variety of other architectures for an endpoint and caching are possible and intended to be covered by claimed subject matter. For example, endpoint 102 and proxy 101 may sit behind a router that may route signal packets, as yet another possibility.

Although a caching proxy is not necessarily required, in some situations, as alluded to previously, a variety of benefits may flow from employing a caching proxy, depending at least in part on the particular embodiment. For example, as previously described for a REST-type architecture, content requests may be managed at least partially via use of a variety of URLs which may be organized in a manner so that particular types of content requests are directed to particular URLs. However, as suggested, in situations in which such an architecture may not be feasible and/or desirable, a caching proxy may facilitate managing content requests directed to an endpoint, such as endpoint 102, e.g., in a situation similar to that described above, where content requests are not managed via use of a variety of URLs.

This may be accomplished, for example, via specification of a caching policy for content requests to be directed to endpoint 102, in which proxy 101 may be employed to implement a specified caching policy, such as in embodiment 100. The terms "caching policy" and "cache policy" as used herein are interchangeable, and refer to a set of rules, processes and the like for determining what content should be cached, for how long, as well as other caching parameters including, as illustrative, but non-limiting examples, size of a cached field and/or amount of available cached space. For an embodiment, a cache policy may be specified in terms of a hierarchical organization of content types, nesting, and/or interrelationships between various content types at various levels of the hierarchical organization.

As an illustration, for an embodiment employing GraphQL as the query language, a cache-policy may be specified in terms of the GraphQL schema for the present version of the GraphQL query language. A GraphQL schema for a web service specifies a set of content types which describe a set of possible content that may be queried on that web service. For example, in an embodiment, a cache policy may specify fields of the GraphQL schema intended to be cacheable, may specify maximum cache size for such fields, and/or may specify cache duration per field. Likewise, a cache policy may specify a variety of other parameters, as alluded to previously. Of course, again, this is an illustrative example, and claimed subject matter is not intended to be limited to illustrative examples. In other embodiments, rather than specifying particular fields, for example, a caching policy may include a list of particular queries to be cached. That list may additionally include selective identification of clients, for which particular queries are to be cached; however this is not necessary and is just an illustrative embodiment.

Thus, for example, in an embodiment, such as 100, content may satisfy a particular query (e.g., referred to as query results), that may be received. Likewise, a query to be received may be evaluated to be wholly cacheable as formulated in a particular query language, such as GraphQL, for example, by application of a caching policy to the query and/or the query results. For such a query, query results (e.g., content) that would satisfy such a query may be cached, such as in cache 103, for example.

In an embodiment, proxy 101 may determine whether a query is wholly cacheable. The phrase "wholly cacheable" means that the object of a query, i.e., the entire query results, as specified by the particular cache policy, would be cacheable. If a query is determined to be wholly cacheable, in an embodiment, proxy 101 may communicate with cache 103, such as via communication channels 114 and 115 shown in FIG. 1, to determine if appropriate query results have been cached (e.g., stored in a cache, such as cache 103). If so, proxy 101 or cache 103 may or may not perform additional processing, depending at least in part on particulars of an embodiment. As an example, assessing age of the cached content and/or otherwise validating the cached content may take place in an embodiment. Of course, these are illustrative examples, and the claimed subject matter is not limited in this regard.

In an embodiment, if it is determined that query results have been cached and if those results are determined to be valid, for example, proxy 101 may obtain the query results from cache 103, and may return them to the client making a content request. Thus, as illustrated in this example, query request and query response may be able to happen without involving endpoint 102. If, for example, it is determined that appropriate query results have not been cached, instead, for an embodiment, proxy 101 may communicate with endpoint 102, as an alternate way to obtain requested content. Thus, in an embodiment, endpoint 102 may receive filtered content requests. That is, in an embodiment, endpoint 102 may receive content requests unable to be satisfied by content stored in cache 103. Likewise, after proxy 101 obtains content from endpoint 102, in an embodiment, proxy 101 may cache the content in cache 103, if it has been determined that the query and/or query results are wholly cacheable, and may provide the content to the source for the content request, such as along communication channels 114-115 and 110-111, respectively, in an embodiment. Although claimed subject matter is not intended to be limited to illustrative embodiments, the example discussed has several potential benefits. For example, decreased latency (and/or increase website responsiveness) with respect to requested content may result. Likewise, as alluded, a lower load may be placed on endpoint 102 in an embodiment. Performance of a mobile application involved in making the request may also be improved as a result of proxy 101 and cache 103.

Figure 2:
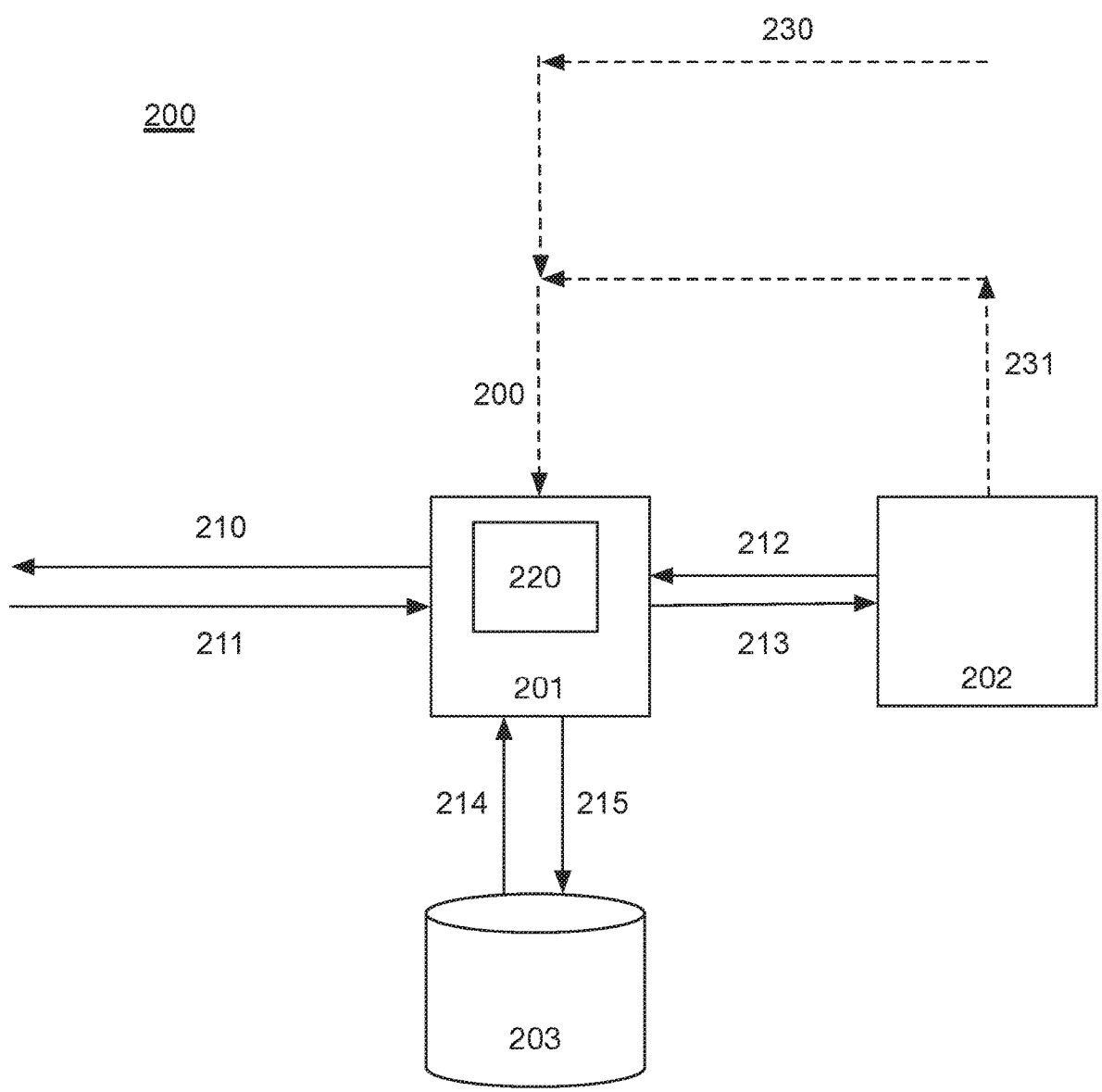
FIG. 2 is a schematic diagram illustrating another embodiment.

FIG. 2 is a schematic diagram similar to FIG. 1, illustrating an embodiment 200. FIG. 2 includes block 220, which depicts a cache policy for server 202 in this illustrative embodiment. showing the cache policy in an embodiment. For convenience, it is intended that proxy 201, endpoint 202, and cache 203 operate in a similar manner as described in connection with FIG. 1.

Cache policy 220 may be implemented via one or more files stored on proxy 201, as an example. In an embodiment, cache policy 220 may specify what content is to-be-cached, and/or how content is-to-be cached, as discussed above. For example, cache policy 220 may specify fields or paths for a GraphQL schema intended to be wholly cacheable. A GraphQL path comprises a description of fields that are followed and/or traversed in order to retrieve requested content. Cache policy 220 may also specify particular shapes of a GraphQL schema that are cacheable. A GraphQL shape comprises a description of included content types and/or interrelationships, including nesting and/or other forms of association, in a GraphQL schema including portions thereof, and/or of a GraphQL query and/or query results. Additionally, cache policy 220 may specify various types of other parameters, such as period of time a field or path may be stored in cache 203, variations in caching parameters per user, if applicable, and/or whether there are various other potentially cache-relevant factors such as amount of current load on endpoint 202, etc. Of course, these are, again, illustrative examples of cache policy 220, and are not meant to limit claimed subject matter.

FIG. 2 further shows that various approaches to implementing cache policy 220 may be employed. For example, arrow 231 is intended to illustrate cache policy 220 being determined, at least in part, by GraphQL schema introspection. GraphQL schema introspection refers to a feature of the GraphQL query language; it enables obtaining the GraphQL schema from endpoint 202. Additionally, via introspection, endpoint 202 may provide more than the GraphQL schema, such as, additionally, cache policy content corresponding to various portions, and/or the totality, of the schema, for example. In some embodiments, as an alternative to introspection, for example, a cache policy, such as 220, may be provided, such as in the form of a configuration file, as described below.

Likewise, as another example, arrow 230 is intended to illustrate cache policy 220 being determined by content received from a system administrator, or other source. For example, a system administrator may create a configuration file specifying cache policy 220, and may provide it to proxy 201. Thus, for example, a configuration file may contain executable code. Alternatively, in an embodiment, a graphical user interface (GUI) may be implemented via executable code, to enable specification of a cache-policy via interaction with the GUI, such as via a point and click selection of features, etc. In embodiments, executable code implementing a GUI may be executable in various ways. For example, code may be executing in a process separate from a proxy (such as proxy 201), and may periodically push cache-policy updates from the GUI to the proxy. Alternatively, a GUI may be executing on a proxy, or on a computing device used for system administration. Again, these are illustrative embodiments and not intended to limit claimed subject matter.

FIG. 3 shows an example GraphQL schema to illustrate sample operation of a sample cache policy for an embodiment. Thus, FIG. 3 includes an example schema 301 and an example cache-policy-annotated schema 302 for an embodiment. Block 310 identifies schema 301 as a schema by the presence of the keyword "schema" outside of the curly brackets, and additionally indicates, by the text "query: RootQuery" that there is a type of query that this schema can provide query results for, namely, RootQuery. In block 311, RootQuery is specified by the keyword(s) "RootQuery" outside of the curly brackets, and by setting forth included fields and related content-type. In this example, three fields are specified, fieldA, fieldB, and fieldC, and indicated to be of type "Int". For example, the text "fieldA: Int" indicates that fieldA is of type Int, and similarly for the other specified fields.

Turning to block 302, schema 301 is provided with example annotations for illustrating an embodiment of a caching policy, or portion thereof. It should be noted that these example annotations are illustrative, and not meant to be limiting in terms of how a schema may be annotated. Similar to block 310, block 320 indicates that block 302 comprises a schema. Annotations in this embodiment are shown in block 321, indicated with a prepended "@" symbol, and followed by cache policy specifics for a particular field of a particular schema. For example, fieldA, of type Int, discussed above, is annotated by "@cache("1 h")". This annotation indicates that field A is cacheable for one hour. In other words, after content corresponding to fieldA is stored in cache, it will remain valid for one hour, after which it will no longer be valid. Similarly, annotations show that fieldB is cacheable for 5 minutes, and that fieldC is not cacheable.

In embodiments, a caching policy may also indicate a maximum amount of cache storage space to be used to cache a field, which also is referred to herein as maximum cache size. For example, an annotated schema similar to that shown in block 321 may include an additional field, not of a fixed-size, and/or does not have a maximum size. This, of course, is not meant to suggest that the "Int" type discussed above necessarily is of a fixed-size or necessarily has a maximum size. As an illustrative and non-limiting example, block 321 may include an additional field, "fieldD," of type "String." In this example, a cache directive as specified by an annotation may comprise "@cache("5 m", {maxSize="1024 kB"}) fieldD: String".

FIG. 4 shows example queries for example schema 301, illustrated in FIG. 3. Query 401 is effectively a query for content in fieldA. As illustrated, fieldA is cacheable for one hour. As such, this query is wholly cacheable, and the process embodiment described above would be followed. Query 402 is effectively a query for content in fieldA and content in field B. Again, fieldA is cacheable for one hour and fieldB is cacheable for 5 minutes. As a whole, this query is wholly cacheable, and the process embodiment described above would be followed. Query 403 is effectively a query for content in fieldA and fieldC. Once again, as illustrated and discussed in connection with FIG. 3, fieldA is cacheable for one hour, but fieldC is not cacheable. Therefore, as a whole, this query example is not cacheable. Query 403 is not a wholly cacheable query, and as such, as such, would be handled differently than 401 and 402, as illustrated in more detail below, for an embodiment.

Figure 5:
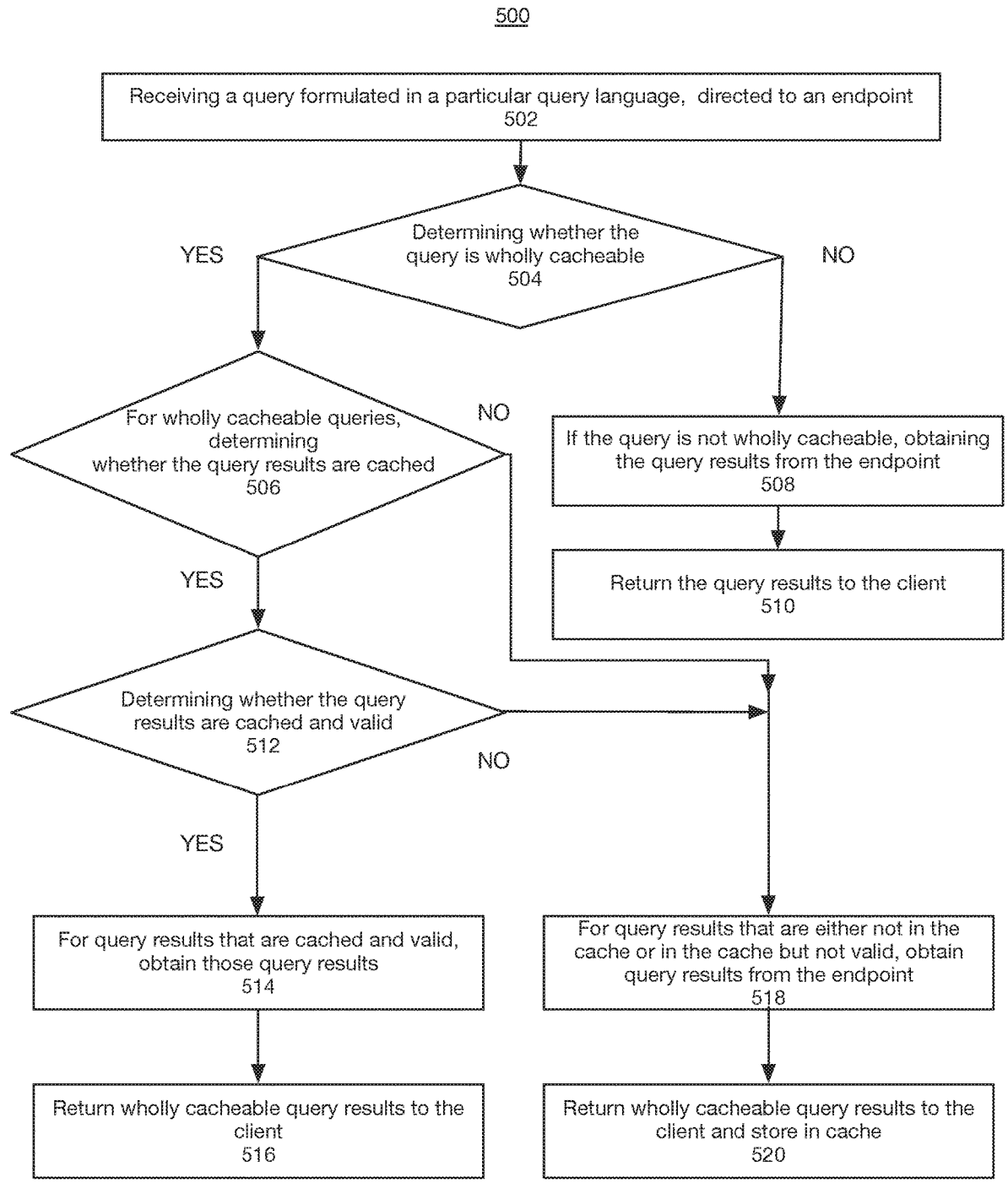
FIG. 5 is a flowchart illustrating an embodiment of a method of processing a content request.

FIG. 5 is a flowchart for an embodiment 500 of a method of processing a content request, such as a content request formulated as a query in a particular query language. As used herein, the phrase "wholly cacheable query", is used to mean a query which seeks content that is wholly cacheable, as described above. Likewise, content sought by a query will be referred to as "query results". Accordingly, the phrase "wholly cacheable query result(s)" will be used interchangeably with the phrase "wholly cacheable query" and/or "wholly cacheable (requested) content".

One or more operations are illustrated in FIG. 5 with respect to a certain sequence of operations that may be employed, in whole or in part. However, other sequences and/or concurrent operations may be employed in whole or in part and be within claimed subject matter. In addition, although the description below references particular aspects and/or features illustrated in certain figures, one or more operations may be performed with other aspects and/or features.

At block 502, a query may be formulated in a particular query language, and may be directed to an endpoint. Likewise, it may be received by a caching proxy, such as proxy 101 and/or proxy 201, as discussed above in connection with FIGS. 1 and/or 2. At block 504, it may be determined whether the query is wholly cacheable. For example, a cache policy, such as cache policy 220, described above in connection with FIG. 2, may be employed in connection with such a determination. Depending at least in part on whether the query is determined to be wholly cacheable, an embodiment may implement different operations. For example, for queries determined to be wholly cacheable, at block 506, the flow proceeds to block 512, where it may be determined whether the content is actually cached, such as, for example, in cache 103 or cache 203, described above in connection with FIGS. 1 and/or 2, respectively. Depending at least in part on determinations made at blocks 506 and 512, an embodiment may implement different operations. For example, after determining at blocks 506 that the query is wholly cacheable, and determining at block 512 that the query results are actually cached, then at block 514, content may be obtained from a cache, such as cache 103 in FIG. 1, after being determined to be cached and valid. At block 516, content obtained from the cache may be returned to a device that had made a content request. As discussed previously, for an embodiment, a content request along the process flow just described may be satisfied without involving an endpoint, such as, for example, endpoint 102 in FIG. 1. However, at block 518, described below, as an alternate path to block 514, an endpoint may be queried. At block 520, obtained content may be returned to a requesting client and may be cached.

If the query is determined to be wholly cacheable at 504, but the result at block 506 or 512 is negative, different operations are performed. In particular, following either a negative determination at block 506 or 512, that is, if wholly cacheable query results are not in the cache, or if they are in the cache but are determined to not be valid, then the process flow moves to block 518. At block 518, the query results are obtained from the endpoint, such as endpoint 102 or 202 in FIG. 1 or 2, respectively. Then, at 520, the obtained wholly cacheable results are both returned to the requesting client, and stored in cache, such as, for example, cache 103 or 203, in FIG. 1 or 2, respectively.

However, for queries determined to not be wholly cacheable at block 504, then, at block 508, that content may be sought from an endpoint, such as endpoints 102 and/or 202, again, as described above in connection with FIGS. 1 and/or 2, respectively. At block 510, content obtained from an endpoint may be provided to a device requesting content. In illustrative embodiments, because the query was determined at block 504 to not be wholly cacheable, the content is not stored in a cache.

In other embodiments, a proxy server may normalize a received query. For example, there may be several different, but logically equivalent ways of specifying a particular query. Through a normalization process, received queries may be reduced to a base logical structure so that relations among them will be more apparent. This may enable more accurate application of a caching policy to received queries. Additionally, in some embodiments, normalization may make other relationships between queries more apparent, such as, for example, whether a query may be a subset or a superset of another query or combination of queries. Again, this is merely illustrative, and not meant to be limiting.

Figure 6:
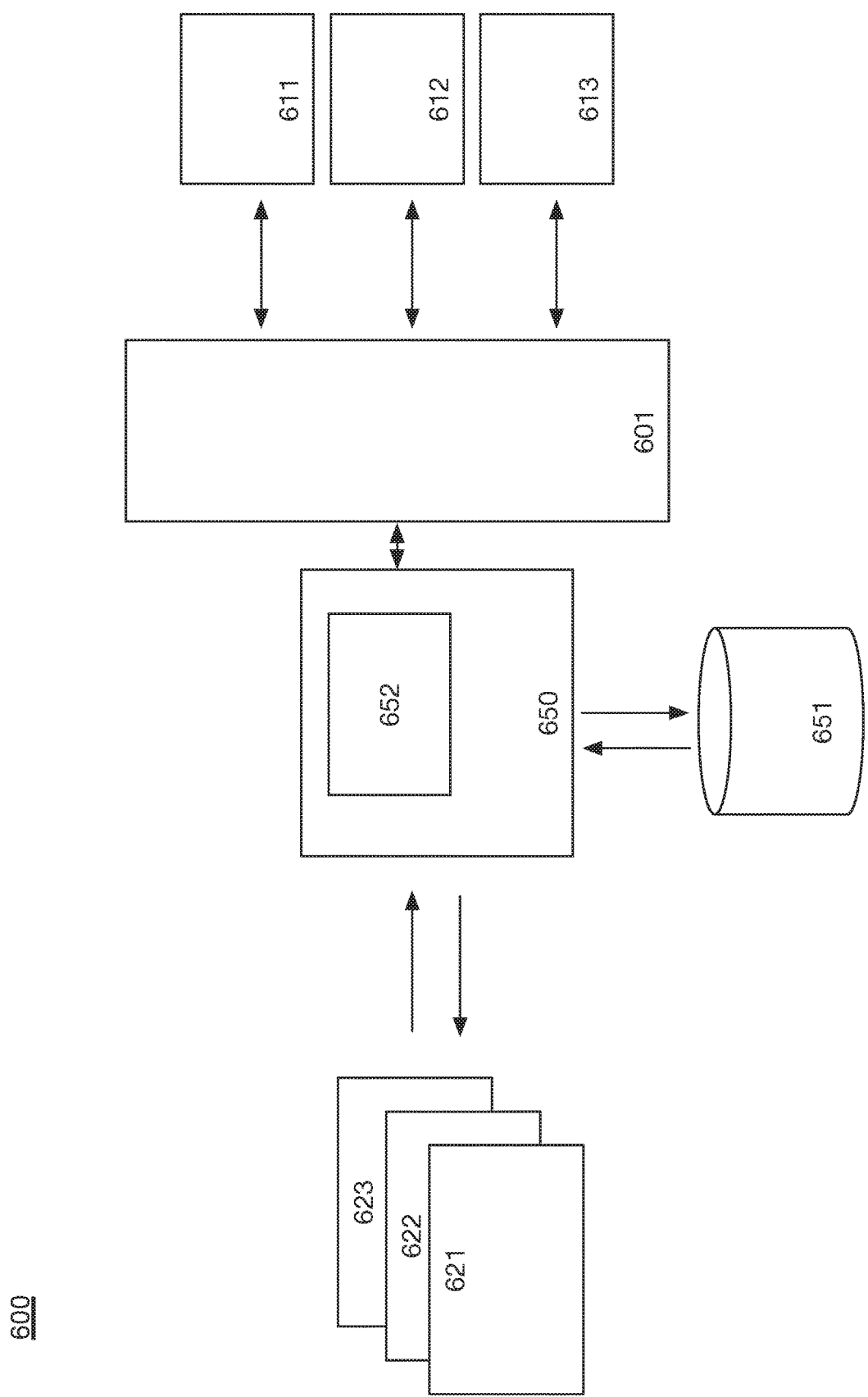
FIG. 6 is a schematic diagram illustrating an embodiment.

FIG. 6 is a schematic diagram of an embodiment 600. In this illustration, endpoint 601 comprises a GraphQL compliant and/or GraphQL compatible endpoint 601. Likewise, FIG. 6 includes content sources 611-613, which may be stored on endpoint 601, such as in a database. Alternatively, content sources 611-613 may be stored on various other network devices communicatively connected to endpoint 601 over a network. Client applications 621-623 comprise executable instructions on one or more client devices able to send GraphQL queries to GraphQL endpoint 601 to request content, such as weather content, event content, etc., for an embodiment. As described above, embodiments include various network structures and paths for the content request to be received and processed in order to have requested content returned. Correspondingly, in embodiments, GraphQL endpoint 601 comprises one or more servers, as previously described, able to process content requests received in the form of GraphQL queries from client applications and, in response to valid queries, obtain requested content from content sources 611-613 and return them, such as in a JSON format, for example, to requesting client applications 621-623 as a JSON payload, in this illustrative example. The term JavaScript Object Notation, JSON, and/or similar terms are intended to refer to any version, now known and/or to be later developed, of the JSON file-format.

Likewise, embodiment 600 includes caching proxy 650, cache 651, and cache policy 652. Moreover, GraphQL endpoint 601 may redirect requests from client applications 621-623 to caching proxy 650. In this example, endpoint 601 initially receives a request, and then sends it to proxy 650. In embodiments, caching proxy 650 may initially receive requests prior to endpoint 601. That is, as was mentioned, there are a variety of ways that endpoint 601 and proxy 650 may interact; claimed subject matter is not intended to be limited in this respect; rather all possible architectures for an endpoint and a caching proxy to interact are intended to be covered by claimed subject matter. Caching proxy 650 is able to operate in a similar matter as proxy 101 and/or 201, described above in connection FIGS. 1 and/or 2, respectively. For example, caching proxy 650 may determine whether a received query comprises a wholly cacheable query, substantially in accordance with cache policy 652, for example. Likewise, embodiment 600 operates in a manner depicted and described in detail with respect to FIG. 5.

As can be seen from the description of various embodiments, a caching proxy server may be employed to evaluate content requests to manage complexity and/or simplify content requests, for example. A caching proxy may likewise also accelerate service requests by retrieving content from a previous request, another benefit may be to reduce hardware cost through reduction in redundancy, such as if multiple systems are to be served or multiple endpoints are to be managed. In embodiments, a proxy server may control, at least in part, scheduling of distribution of requested content to users. This could provide benefits in various embodiments, for example, a mobile application that has requested content from various sources, and with various caching policies. Thus, for example, a proxy server may improve performance of a mobile application by coordinating multiple items of retrieved content, whether from an origin server or a cache, for example, in order that a mobile application is able to receive requested content in a more coordinated fashion, such as from a timing perspective. Accordingly, embodiments may improve performance of mobile applications.

Additionally, as previously illustrated via embodiments, a great deal of flexibility to formulate cache policies exists with respect to an embodiment. Other caching approaches may suffer from being overbroad or too narrow, that is, too much content may be cached, which may negatively affect performance, or too little content is cached, which may inhibit realization of performance benefits. ability to flexibly formulate cache policy may provide benefits with a potential to inure to both mobile application and server performance at least for some embodiments, potentially lowering costs and/or improving user experience.

Moreover, embodiments of claimed subject matter are able to be flexible and/or permit a powerful formulation of a cache policy without unduly affecting an API. That is, for example, developers of mobile applications need not be burdened with understanding caching policy. Likewise, a website administrator may adjust cache policy according to various factors, without significantly affecting legacy APIs, so that software updates corresponding to changes in cache policy is not necessarily needed.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 7, a system embodiment may comprise a local network (e.g., device 704 and medium 740) and/or another type of network, such as a computing and/or communications network. For purposes of illustration, therefore, FIG. 7 shows an embodiment 700 of a system that may be employed to implement either type or both types of networks. Network 708 may comprise one or more network connections, links, processes, services, applications, and/or resources to facilitate and/or support communications, such as an exchange of communication signals, for example, between a computing device, such as 702, and another computing device, such as 706, which may, for example, comprise one or more client computing devices and/or one or more server computing device. By way of example, but not limitation, network 708 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in the foregoing paragraphs [0046]-[0047] and FIGS. 6-7 of the present disclosure.

Referring now to FIG. 7, in an embodiment, first and third devices 702 and 706 may be capable of rendering a graphical user interface (GUI) for a network device and/or a computing device, for example, so that a user-operator may engage in system use. Device 704 may potentially serve a similar function in this illustration. Likewise, in FIG. 7, computing device 702 ('first device' in figure) may interface with computing device 704 ('second device' in figure), which may, for example, also comprise features of a client computing device and/or a server computing device, in an embodiment. Processor (e.g., processing device) 720 and memory 722, which may comprise primary memory 724 and secondary memory 726, may communicate by way of a communication bus 715, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 704, as depicted in FIG. 7, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 702.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 7, computing device 702 may provide one or more sources of executable computer instructions in the form physical states and/or signals (e.g., stored in memory states), for example. Computing device 702 may communicate with computing device 704 by way of a network connection, such as via network 708, for example. As previously mentioned, a connection, while physical, may not necessarily be tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, such as relating to one or more users, and may also comprise a device-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method of operating a proxy device for a logical endpoint device, the logical endpoint device capable of responding to electronically received query requests made in a particular query language, the logical endpoint device and proxy device capable of communicating via a communications network, the method comprising:
   electronically receiving at the proxy device one or more query requests directed to the logical endpoint device from one or more client devices capable of communicating via the communications network;
   processing, utilizing at least one processor of the proxy device, a first query request of the one or more electronically received query requests to determine whether a particular result of the first query request is cacheable based at least in part on a particular cache policy of the logical endpoint device specified by one or more caching parameters via a network protocol of the communications network, the particular cache policy of the logical endpoint device specifying one or more cacheable portions and one or more non-cacheable portions of a schema of the particular query language, wherein the processing the first query request to determine whether the particular result of the first query request is cacheable comprises the at least one processor of the proxy device traversing particular paths and/or fields of the schema of the particular query language specified to be cacheable by the particular cache policy of the logical endpoint device; and
   obtaining at the proxy device the particular result of the first query request from a cache responsive at least in part to a determination by the at least one processor of the proxy device that the particular result of the first query request is cacheable and responsive at least in part to the particular result of the first query request having been previously cached, wherein the processing the first query request and the obtaining the cached particular result of the first query request to occur without accessing the logical endpoint device.

2. The method of claim 1,
   wherein the cache either being within a network device communicatively coupled to the proxy device or being within the proxy device.

3. The method of claim 2, further comprising:
   transmitting the particular result of the first query request to at least a first of the one or more client devices.

4. The method of claim 3, further comprising:
   obtaining the particular cache policy of the logical endpoint device; and
   storing the one or more caching parameters in a memory of the proxy device.

5. The method of claim 4, wherein the particular cache policy of the logical endpoint device specifies cacheable fields of the schema of the particular query language.

6. The method of claim 4, wherein the particular cache policy of the logical endpoint device further specifies particular cacheable queries.

7. The method of claim 4, wherein the particular query language comprises GraphQL, the first query request comprises a GraphQL query, and the logical endpoint device comprises a logical GraphQL endpoint device.

8. The method of claim 7, wherein the particular cache policy of the logical GraphQL endpoint device further specifies cacheable fields of the schema of the GraphQL query language for the logical GraphQL endpoint device.

9. The method of claim 7, wherein the particular cache policy of the logical GraphQL endpoint device further specifies particular cacheable GraphQL queries of the logical GraphQL endpoint device.

10. The method of claim 9, wherein the schema of the GraphQL query language for the logical GraphQL endpoint device is obtained by GraphQL introspection.

11. The method of claim 7, further comprising: for a second query request of the one or more electronically received GraphQL query requests having results determined to not be stored in the cache, obtaining the results of other related GraphQL queries from the cache.

12. The method of claim 11, wherein the obtaining the results of the other related GraphQL queries from the cache comprises normalizing the second query request.

13. The method of claim 11, wherein the obtaining the results of other related GraphQL queries from the cache comprises determining whether results of a superset GraphQL query of the second query request are in the cache.

14. The method of claim 7, further comprising obtaining an updated particular cache policy of the logical GraphQL endpoint device without updating a corresponding application programming interface.

15. An article comprising:
a non-transitory computing storage medium having stored thereon instructions executable by at least one computing device, the at least one computing device comprising at least one processor and at least one memory to:
execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;
wherein the computer instructions to be executed comprise instructions to operate a proxy device for a logical endpoint device to respond to query requests made in a particular query language, the logical endpoint device and proxy device capable of communicating via a communications network;
wherein the instructions to be executed as a result of the execution to:
electronically receive at the proxy device one or more query requests directed to the logical endpoint device from one or more client devices able to communicate via the communications network;
process a first query request of the one or more query requests to determine whether a particular result of the first query request is cacheable based at least in part on a particular cache policy of the logical endpoint device specified by one or more caching parameters via a network protocol of the communications network, the particular cache policy of the logical endpoint device specifying one or more cacheable portions and one or more non-cacheable portions of a schema of the particular query language, wherein, to process the first query request to determine whether the particular result of the first query request is cacheable, the at least one processor to traverse particular paths and/or fields of the schema of the particular query language specified to be cacheable by the particular cache policy; and
obtain at the proxy device particular result of the first query request from a cache responsive at least in part to a determination by the at least one processor that the particular result of the first query request is cacheable and responsive at least in part to the particular result of the first query request having been previously cached, wherein the processing the first query request and the obtaining the cached particular result of the first query request to occur without accessing the logical endpoint device.

16. The article of claim 15, wherein
the cache being within a network device communicatively coupled to the proxy device or being within the proxy device;
and wherein the instructions to be executed as a result of the execution are further to transmit the particular result of the first query request to at least a first of the one or more client devices.

17. The article of claim 16, wherein the particular query language is to comprise GraphQL, the respective first query request to comprise a GraphQL query, the logical endpoint device to comprise a logical GraphQL endpoint device and the schema of the particular query language to comprise a GraphQL schema.

18. The article of claim 17, wherein the particular cache policy of the logical GraphQL endpoint device further to specify cacheable fields of the GraphQL schema and particular cacheable GraphQL queries.

19. The article of claim 18, wherein the instructions to be executed as a result of the execution are further to:
obtain the particular cache policy of the logical GraphQL endpoint device for use at least in part with respect to the determination regarding whether the particular result of the first query request, wherein the particular cache policy of the logical GraphQL endpoint device to specify the one or more cacheable portions and the one or more non-cacheable portions of the GraphQL schema.

20. The article of claim 19, wherein the instructions to obtain the first query results are further to: normalize the first query request and determine whether results of other related GraphQL queries from the cache comprise a superset GraphQL query of the first query request.

21. The article of claim 20, wherein the instructions to be executed as a result of the execution are further to obtain the GraphQL schema for the logical GraphQL endpoint device via GraphQL introspection.

22. The article of claim 20, wherein the instructions to be executed as a result of the execution are further to obtain an updated GraphQL cache policy of the logical GraphQL endpoint device without a change to a corresponding application programming interface.

23. A caching proxy device for a logical endpoint device, comprising:
at least one processor, the caching proxy device to respond to query requests made in a particular query language, the caching proxy device to communicate with the logical endpoint device via a communications network;
the caching proxy device to electrically receive one or more query requests from one or more client devices, directed to the logical endpoint device, the one or more client devices to communicate via the communications network; and
the caching proxy device to determine whether a particular result of a first query request of the one or more electronically received query requests is cacheable based at least in part on a particular cache policy of the logical endpoint device specified by one or more caching parameters via a network protocol of the communications network, the particular cache policy of the logical endpoint device specifying one or more cacheable portions and one or more non-cacheable portions of a schema of the particular query language, wherein, to process the first query request to determine whether the particular result of the first query request is cacheable, the at least one processor to traverse particular paths and/or fields of the schema of the particular query language specified to be cacheable by the particular cache policy; and the caching proxy device to obtain the particular result of the first query request from a cache responsive at least in part to a determination by the at least one processor that the particular result of the first query request is cacheable and responsive at least in part to the particular result of the first query request having been previously cached, wherein the processing the first query request and the obtaining the cached particular result of the first query request to occur without accessing the logical endpoint device.

24. The caching proxy device of claim 23,
wherein the caching proxy device further to transmit the particular result of the first query request to at least a first of the one or more client devices.

25. The caching proxy device of claim 24, wherein the particular query language to comprise GraphQL, the first query request to comprise a GraphQL query, the logical endpoint device to comprise a logical GraphQL endpoint device and the schema of the particular query language to comprise a GraphQL schema of the logical GraphQL endpoint device.

26. The caching proxy device of claim 25, further to:
obtain the particular cache policy of the logical GraphQL endpoint device for use at least in part with respect the determination regarding whether the particular result of the first query request is cacheable, the particular cache policy of the logical GraphQL endpoint device to specify the one or more cacheable and non-cacheable portions of the GraphQL schema of the logical GraphQL endpoint device.

27. The caching proxy device of claim 26, the particular cache policy of the logical GraphQL endpoint device further to specify cacheable fields of the GraphQL schema of the logical GraphQL endpoint device and particular cacheable GraphQL queries of the logical GraphQL endpoint device.

28. The caching proxy device of claim 27, further to: normalize the first query request and determine whether results of other related GraphQL queries in the cache comprise a superset GraphQL query of the first query request.

29. The caching proxy device of claim 27, further to obtain the GraphQL schema for the logical GraphQL endpoint device via GraphQL introspection.

30. The caching proxy device of claim 27, further to obtain an updated GraphQL cache policy of the logical GraphQL endpoint without a change to a corresponding application programming interface.

* * * * *